United States Patent Office 2,738,354
Patented Mar. 13, 1956

2,738,354

PROCESS OF MAKING AMINO-ANTHRAQUINONES

Walter Kern, Sissach, and Walter Jenny, Reinach, Switzerland, assignors to Ciba Limited, Basel, Switzerland, a Swiss firm No Drawing. Application January 9, 1952,
Serial No. 265,728

Claims priority, application Switzerland
January 24, 1951

3 Claims. (Cl. 260—371)

The present invention provides a process for the reduction of nitroanthraquinones. The nitroanthraquinones subjected to the reduction are those which contain the nitro group in an α-position of one of the benzene rings of the anthraquinone nucleus and an alkyl sulfone group in a β-position of the other benzene ring of the anthraquinone nucleus, and the reduction is carried out with water-soluble salts of hydrosulfuric acid.

As nitronanthraquinones to be subjected to the reduction there come into consideration more especially 1-nitro-6- and -7-alkyl-sulfone-anthraquinones, of which the anthraquinone nuclei are free from further substituents and of which the alkyl group contains only a few, for example, 1–5 carbon atoms, the carbon chain being straight or branched. These nitro-alkylsulfone-anthraquinones are new. They can be made by nitrating β-alkyl-sulfone-anthraquinones, for example, with a mixture of sulfuric acid and nitric acid. There are obtained mixtures of isomeric nitro compounds, which consist mainly of 1-nitro-6- and -7-alkyl-sulfone-anthraquinones. While in certain cases, for example, in the case of 1-nitro-6-methyl-sulfone-anthraquinone it is easy, and in the case of 1-nitro-7-methyl-sulfone-anthraquinone somewhat more difficult, to obtain pure unitary nitro compounds from the isomeric mixture by separating them from the nitration mixture by dilution with water, redissolution in concentrated sulfuric acid and precipitating in succession 1-nitro-6-methyl-sulfone-anthraquinone and 1-nitro-7-methyl-sulfone-anthraquinone by the addition of water, it is difficult in this manner to prepare other unitary 1-nitro-6- and -7-alkyl sulfone anthraquinones, for example, the isopropyl compounds.

The present invention makes it possible to obtain from such isomeric mixtures resulting from the nitration of β-alkyl sulfone-anthraquinones, and with which the above-described method of separation is impracticable, unitary 1-amino-6-alkyl sulfone-anthraquinones to be separated from the other reduction products and then to obtain from the residual reduction mixture the 1-amino-7-alkyl-sulfone-anthraquinones.

The manner in which 1-nitro-6- and -7-alkyl sulfone anthraquinones react with water-soluble salts of hydrosulfuric acid in an aqueous medium is as follows: At a raised temperature, for example, at the boiling temperature of the reaction mixture, generally not only is the nitro group reduced to an amino group but also the alkyl-sulfone group is exchanged for a mercapto group.

However, at a suitably low reaction temperature 1-nitro-6- and -7-alkyl-sulfone-anthraquinone do not act in the same manner. In the case of the latter compound the above mentioned conversion of the alkyl sulfone group into a mercapto group occurs in addition to the reduction of the nitro group, but with the former compound the alkyl-sulfone group remains unchanged, and only the nitro group is reduced. If, therefore, an isomeric mixture consisting principally of 1-nitro-6- and -7-alkyl-sulfone-anthraquinones is reduced in this manner, a 1-amino-6-alkyl-sulfone-anthraquinone is obtained as a residue. After separating the latter, the 1-amino-7-mercapto-anthraquinone dissolved in the filtrate in the form of an alkali metal or ammonium salt can be separated, for example, by the addition of an acid or a salt.

As stated above, there may be used as the starting material in the reduction process of this invention isomeric mixtures obtained by the nitration of β-alkyl-sulfone-anthraquinones. As examples of β-alkyl-sulfone-anthraquinones there may be mentioned β-methyl-, β-ethyl-, β-n-propyl, β-isopropyl- or β-n-butyl-sulfone-anthraquinone.

The water-soluble salts of hydrosulfuric acid serving as reducing agents in the present process may be sulfides or advantageously hydro-sulfides. As examples there may be mentioned ammonium sulfides, hydro-sulfides of alkaline earth metals, such as calcium hydrosulfide and alkali metal sulfides such as sodium sulfide. Especially advantageous are alkali metal hydro-sulfides, for example, sodium hydrosulfide.

The reduction is advantageously carried out in an aqueous medium. Since the nitro-alkyl-sulfone-anthraquinones to be reduced and, insofar as the alkyl sulfone group is retained during the reduction, also the reduction products are water-insoluble, it is advisable to use the nitro compounds in a very finely dispersed condition.

The 1-amino-7-mercapto-anthraquinones, which are obtained as stated above in the reduction of a mixture consisting of 1-nitro-6- and -7-alkyl sulfone anthraquinone, may be treated with the usual alkylating agents, and the resulting 1-amino-7-alkyl mercapto-anthraquinones converted by oxidation, for example, by means of peroxides, especially hydrogen peroxide, into the corresponding 1-amino-7-alkyl-sulfone-anthraquinones.

As will be understood from the foregoing description, the present invention enables 1-amino-6- and -7-alkyl-sulfone-anthraquinone to be obtained practically free from isomers. If desired, there may also be made 1-amino-6-alkyl-sulfone-anthraquinones which contain an alkyl group other than that present in the 1-nitro-6-alkyl-sulfone-anthraquinone or a mixture of 1-nitro-6- and -7-alkyl-sulfone-anthraquinone used as starting material. For this purpose, for example, 1-nitro-6-methyl-sulfone-anthraquinone is reduced in the manner described above to 1-amino-6-mercapto-anthraquinone; or 1-amino-6-methyl-sulfone-anthraquinone obtained by the reduction of a mixture of 1-nitro-6- and -7-methyl-sulfone-anthraquinone and then isolated, is converted into 1-amino-6-mercapto-anthraquinone, the mercapto group is treated with an alkylating agent (other than a methylating agent) and finally the alkyl mercapto group is oxidized to the corresponding alkyl sulfone group.

The products of the invention are new. They are aminoanthraquinones, which contain the amino group in an α-position of one of the benzene rings of the anthraquinone nucleus and an alkyl sulfone group or an alkyl mercapto group in a β-position of the other benzene ring of the anthraquinone nucleus. These new compounds are valuable intermediate products, for example, for the manufacture of vat dyestuffs of the anthraquinone series.

The following examples illustrate the invention, the parts and percentages being by weight:

*Example 1*

229 parts of 2-methyl-sulfone-anthraquinone are dissolved in 910 parts of sulfuric monohydrate at room temperature. The whole is then heated to 80° C. and a mixture of 64 parts of nitric acid of 96 per cent strength and 64 parts of sulfuric monohydrate is introduced dropwise, while stirring, in the course of 1 hour. After stirring for ½ hour at 100° C., the mixture is allowed to cool, 260 parts of water are added cautiously, the whole is filtered with suction, and the filter residue is washed with sulfuric acid of 70 per cent strength, and washed free from acid with water. The filter cake is ground well with 1630 parts of water and after the addition of 6600 parts of water and 1265 parts of sodium hydrosulfide solution of 30 per cent strength the whole is stirred at 64–67° C. for 5 hours. After cooling, the mixture is filtered with suction, and the filter residue is washed with water and dried. After recrystallization once from ortho-dichlorobenzene there are obtained red needles which consist of pure 1-amino-6-methyl-sulfone-anthraquinone. The filtrate containing sodium hydrosulfide is mixed with a large quantity of sodium chloride, and after allowing the mixture to stand for 24 hours at 0–5° C., the precipitate is separated by filtering with suction. The sodium salt of 1-amino-7-mercapto-anthraquinone, after being washed with sodium chloride solution, may be dissolved in water and methylated with methyl iodide. After recrystallization from nitrobenzene the reaction product forms orange-brown crystals, which dissolve with a cornflower blue coloration in concentrated sulfuric acid. The product is pure 1-amino-7-methyl-mercapto-anthraquinone. It can be oxidized to 1-amino-7-methyl-sulfone anthraquinone, for example, in acetic acid with hydrogen peroxide. When recrystallized from nitrobenzene, 1-amino-7-methyl-sulfone-anthraquinone forms brown crystals, which dissolve in concentrated sulfuric acid with a weak yellow-brown coloration.

*Example 2*

15 parts of 1-nitro-6-methyl-sulfone-anthraquinone are finely pulverized and suspended in 600 parts of water. After the addition of 82 parts of sodium hydrosulfide solution of 30 per cent strength, the whole is stirred for 5 hours at 64–67° C., filtered with suction while hot, and the filter residue is washed with water and dried. By recrystallization from ortho-dichlorobenzene there is obtained 1-amino-6-methyl-sulfone-anthraquinone crystallizing in red-brown needles.

1-nitro-6-methyl-sulfone-anthraquinone is prepared as follows:

229 grams of 2-methyl-sulfone-anthraquinone are slowly introduced into 480 grams of sulfuric monohydrate at room temperature. While stirring, the temperature is raised to 80° C., and then a mixture of 64 grams of nitric acid of 96 per cent strength and 64 grams of sulfuric monohydrate is introduced dropwise in the course of 1 hour, whereupon the temperature rises to 90° C. After stirring for a further ½ hour at 100° C. the whole is allowed to cool, and then cautiously introduced into a mixture of ice and water, the whole is then filtered with suction, and the filter residue is washed until neutral and dried. In order to separate the isomers, for example, 130 grams of the nitration product are introduced at 10° C. into 1 kilogram of sulfuric acid of 95 per cent strength and the whole is stirred until dissolution is complete. 188 grams of sulfuric acid of 50 per cent strength are then introduced dropwise at 10–15° C. in the course of about ½ hour, and the whole is stirred for a further 3½ hours at 10–12° C. The precipitated 1-nitro-6-methyl-sulfone-anthraquinone is separated by filtering with suction, washed with sulfuric acid of 88 per cent strength and poured into a mixture of ice and water. The resulting suspension is filtered with suction, and the filter residue is washed until neutral and dried.

*Example 3*

68 parts of 1-nitro-6-methyl-sulfone anthraquinone (see Example 2) are finely pulverized and suspended in 2800 parts of water. The suspension is then heated to the boil, mixed with 380 parts of sodium hydrosulfide solution of 30 per cent strength and stirred for 2 hours at 100–101° C. After air has been blown through the cooled solution for a few hours, the resulting crystalline precipitate is separated by filtering with suction. The resulting sodium salt of 1-amino-6-mercapto-anthraquinone dissolves in water and can be methylated with methyl iodide. The methylation product crystallizes from trichlorobenzene in the form of red-brown crystals and is pure 1-amino-6-methyl-mercapto-anthraquinone. The compound dissolves in concentrated sulfuric acid with a somewhat less pure blue coloration than the 1-amino-7-methyl-mercapto-anthraquinone described in Example 1.

*Example 4*

30 parts of 1-nitro-7-methyl-sulfone-anthraquinone are finely pulverized and suspended in 1200 parts of water. After the addition of 165 parts of sodium hydrosulfide solution of 30 per cent. strength the whole is stirred for 5 hours at 64–67° C. The whole is then cooled, and mixed with 160 parts of sodium chloride, stirred for a few hours at 0–5° C., filtered with suction, and the filter residue is washed with sodium chloride solution of 10 per cent. strength. The filter cake (the sodium salt of 1-amino-7-mercapto-anthraquinone) is dissolved in 800 parts of water, and the solution is mixed with 10 parts of methyl iodide and stirred for 3½ hours at room temperature. The reaction product, which is separated by filtering with suction, after recrystallization from nitrobenzene is in the form of brown-orange crystals which dissolve in concentrated sulfuric acid with a cornflower blue coloration. It is pure 1-amino-7-methyl-mercapto-anthraquinone.

1-nitro-7-methyl-sulfone-anthraquinone may be prepared as follows:

229 parts of 2-methyl-sulfone-anthraquinone are dissolved at room temperature in 480 parts of sulfuric monohydrate. Nitration is carried out in the course of 1 hour with a mixture of 64 parts of nitric acid of 96 per cent. strength and 64 parts of sulfuric monohydrate at 80° C. After stirring the whole for ½ hour at 100° C., it is allowed to cool, introduced into ice water, filtered with suction, and the filter residue is washed neutral and dried. 130 parts of the resulting isomeric mixture are dissolved at room temperature in 1000 parts of sulfuric acid of 95 per cent. strength. The whole is then mixed with 188 parts of sulfuric acid of 50 per cent. strength while stirring, and stirring is continued at 10–15° C. for 4 hours. The whole is then filtered with suction, and the filter residue is washed with 300 parts of sulfuric acid of 88 per cent. strength. The resulting filtrate is mixed at 5–12° C. while stirring, with water until the concentration of sulfuric acid reaches 80 per cent. After stirring for 3 hours, the mixture may be filtered with suction, and the filter residue washed with sulfuric acid of 80 per cent. strength and with water and dried. The resulting crude 1-nitro-7-methyl-sulfone-anthraquinone dissolves in concentrated sulfuric acid with a feebly yellowish coloration.

*Example 5*

252 parts of 2-iso-propyl-sulfone-anthraquinone (prepared by isopropylating sodium 2-mercapto-anthraquinone and subsequent oxidation of the 2-iso-propyl-mercapto-anthraquinone with chromium trioxide in glacial acetic acid) are dissolved in 480 parts of sulfuric monohydrate at room temperature. Nitration is carried out in the course of 1 hour with a mixture of 65 parts of nitric acid of 96 per cent. strength and 65 parts of sulfuric monohydrate at 80–83° C. After stirring the mixture for a further ½ hour at 100° C., it is allowed to cool and dried. The powdered residue is dissolved in 3000 parts of sulfuric acid of 98 per cent. strength. The whole is diluted by slowly introducing dropwise water or dilute acid while stirring, until the concentration of the acid is 75 per cent., the mixture is then stirred for 2 hours at 0–5° C., filtered with suction, and the filter residue is washed with sulfuric acid of 75 per cent. strength, then washed until neutral and dried. 14.6 parts of the resulting nitro-isopropyl sulfone-anthraquinone mixture are ground overnight with 40 parts of water. After the addition of 660 parts of water and 150 parts of sodium hydrosulfide solution of 30 per cent. strength, the whole is stirred for 1½ hours at 90° C., filtered with suction while hot and the filter residue is washed until neutral and dried. By recrystallization from ortho-dichlorobenzene 1-amino-6-isopropyl-sulfone anthraquinone is obtained in the form of flat red needles which melt at 218–220° C. The analysis of the product is as follows: Carbon calculated 62.00 per cent., found 61.81 per cent., hydrogen calculated 4.59 per cent., found 4.47 per cent., nitrogen calculated 4.2 per cent., found 4.1 per cent.

What is claimed is:

1. Process for the reduction of nitroanthraquinones, which comprises reducing, in an aqueous medium at a temperature below the boiling point of the reaction mixture, with a water-soluble salt of hydrosulfuric acid a member selected from the group consisting of (a) a nitro-anthraquinone which contains the nitro group in an α-position of one of the benzene rings of the anthraquinine nucleus and an alkyl-sulfone group in a β-position of the other benzene ring of the anthraquinone nucleus and (b) an isomeric mixture of nitro-anthraquinone alkylsulfones as defined under (a).

2. Process for the reduction of nitroanthraquinones, which comprises reducing, in an aqueous medium at a temperature below the boiling point of the reaction mixture, with a water-soluble salt of hydrosulfuric acid a nitro-anthraquinone of the formula

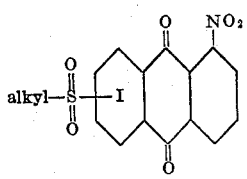

wherein the alkyl-$SO_2$-group is bound in a β-position of the benzene ring marked I of the anthraquinone nucleus and the alkyl group contains at the most 5 carbon atoms.

3. Process for the reduction of nitroanthraquinones, which comprises reducing, in an aqueous medium at a temperature below the boiling point of the reaction mixture, with a water-soluble salt of hydrosulfuric acid a mixture consisting substantially of the isomers of the

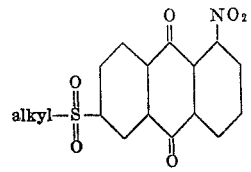

and wherein the alkyl group contains at the most 5 carbon atoms and recovering from alkaline aqueous solution the 1-amino-anthraquinone-6-alkylsulfone which is insoluble in said solution.

References Cited in the file of this patent

UNITED STATES PATENTS

| | | |
|---|---|---|
| 2,176,630 | Klein | Oct. 17, 1939 |
| 2,434,765 | Grossmann | Jan. 20, 1948 |

FOREIGN PATENTS

| | | |
|---|---|---|
| 72,453 | Switzerland | May 16, 1916 |
| 263,843 | Great Britain | Apr. 5, 1928 |